United States Patent
Kilmartin et al.

(10) Patent No.: US 6,865,959 B2
(45) Date of Patent: Mar. 15, 2005

(54) TORQUE SENSOR WITH CONTOURED MAGNETOELASTIC ELEMENT

(75) Inventors: Brian Kilmartin, Cheshire, CT (US); Darek Pszczola, Southington, CT (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 13 days.

(21) Appl. No.: 10/246,166

(22) Filed: Sep. 18, 2002

(65) Prior Publication Data

US 2004/0050179 A1 Mar. 18, 2004

(51) Int. Cl.[7] .................................................. G01L 3/02
(52) U.S. Cl. ............................................... 73/862.333
(58) Field of Search ........................... 73/862, 862.08, 73/862.321, 862.325, 862.331, 862.333, 862.335

(56) References Cited

U.S. PATENT DOCUMENTS

| | | | | |
|---|---|---|---|---|
| 4,852,411 A | * | 8/1989 | Beihoff | 73/862.335 |
| 4,933,580 A | * | 6/1990 | Ishino et al. | 73/862.334 |
| 5,052,232 A | * | 10/1991 | Garshelis | 73/862.336 |
| 5,574,231 A | * | 11/1996 | Blomkvist et al. | 73/862.336 |
| 5,831,180 A | * | 11/1998 | Tanaka et al. | 73/862.333 |
| 6,237,428 B1 | * | 5/2001 | Odachi et al. | 73/862.333 |
| 6,260,422 B1 | * | 7/2001 | Odachi et al. | 73/862.334 |
| 6,330,833 B1 | | 12/2001 | Opie | |
| 2002/0020230 A1 | * | 2/2002 | Opie et al. | 73/862.333 |

FOREIGN PATENT DOCUMENTS

| | | |
|---|---|---|
| EP | 0 366 217 B1 | 5/1990 |
| EP | 0 422 702 B1 | 4/1991 |

* cited by examiner

*Primary Examiner*—Edward Lefkowitz
*Assistant Examiner*—Takisha Miller

(57) ABSTRACT

A torque sensor has a contoured magnetoelastic element that generates a magnetic field having a shape that exhibits gradual changes rather than sharp peaks in the axial direction, making the torque sensor less sensitive to positional changes between the magnetoelastic element and a magnetometer in the sensor. The element is contoured in any desired shape to modify the magnetic field generated by the element when it is deformed through applied torque. In one embodiment, the element is a magnetic material coating applied to a contoured shaft.

15 Claims, 2 Drawing Sheets

TORQUE SENSOR WITH CONTOURED MAGNETOELASTIC ELEMENT

TECHNICAL FIELD

The present invention is directed to torque sensors, and more particularly to magnetoelastic torque sensors that measure torque in a shaft by monitoring changes in a magnetic field generated by a magnetoelastic element coupled to the shaft.

BACKGROUND OF THE INVENTION

Torque sensors known in the art rely on a magnetoelastic element attached to a component to sense torsion forces in the component. Deformation in the component caused by applied torque deforms the magnetoelastic element, resulting in a magnetic field that is proportional to the applied torque. A magnetometer disposed near the element detects the magnitude and polarity of the magnetic field, which indicates the magnitude and polarity of the applied torque.

Magnetoelastic elements applied to cylindrical shafts are normally cylindrical as well to accurately reflect any changes in the shaft caused by applied torque. The magnetic field generated by a cylindrical element, however, tends to have a sharp spike at the measurement location, requiring precise alignment between the magnetometer and the element to obtain accurate readings of the spike. Normal mechanical mounting tolerances may cause slight axial and/or radial misalignments, however, making the magnetometer sensitive to the relative position of the element and the magnetometer. More particularly, if the magnetometer and/or element position shifts slightly and measures the magnetic field in an area other than the spike, the magnetometer will falsely indicate a change in the applied torque. Tighter tolerances may help reduce misreadings, but can be difficult to maintain during normal operations.

There is a desire for a torque sensor that is less sensitive to the physical alignment between the element and the magnetometer.

SUMMARY OF THE INVENTION

Accordingly, the present invention is directed to a torque sensor and a method of making a torque sensor having a magnetoelastic element that generates a magnetic field having a shape exhibiting a gradual change in the axial direction of the shaft, making the torque sensor less sensitive to positional changes between the element and a magnetometer in the sensor. The element is contoured in any desired shape to modify the magnetic field generated by the element when it is deformed through applied torque.

In one embodiment, the magnetoelastic element is a magnetic material coating applied to a contoured shaft. Because the coating follows the contours of the shaft, the element formed by the coating will be contoured as well. Further, the coating is intimately connected with the shaft, ensuring that deformations in the element, and thus the resulting magnetic field, will accurately reflect deformations in the shaft.

DETAILED DESCRIPTION OF THE EMBODIMENTS

Figure 1:
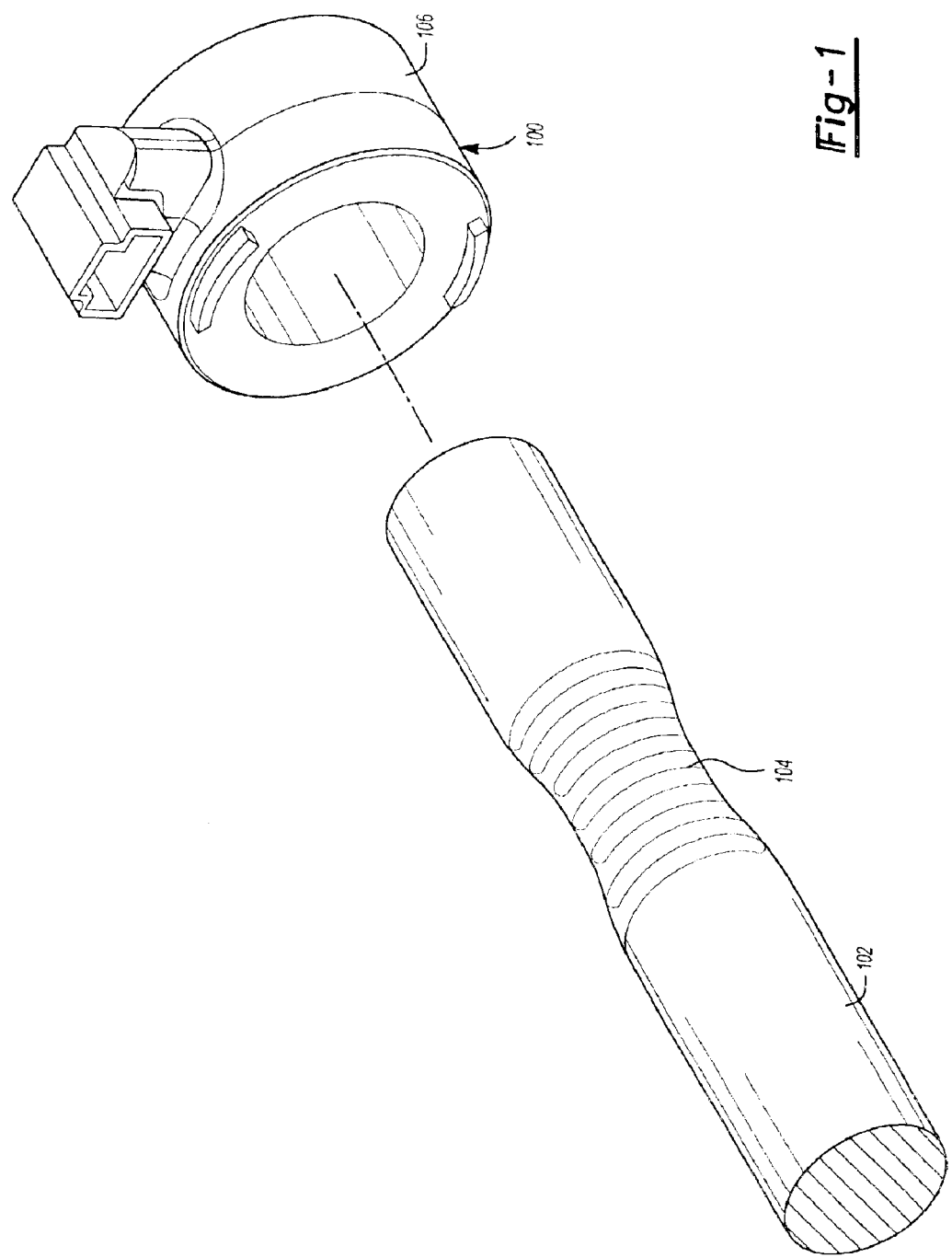
FIG. 1 is a perspective exploded view of a shaft and torque sensor according to one embodiment of the invention.

Referring to FIG. 1, a non-compliant magnetoelastic torque sensor 100 measures torque applied to a shaft 102 by sensing magnetic field changes caused by the applied torque. The sensor 100 includes a magnetoelastic element 104 disposed on the shaft 102 and preferably bonded to the shaft 102 so that any torsion force applied to the shaft 102 will also deform the element 104.

More particularly, the element 104 is disposed at a desired location on the shaft 102 and encircles the shaft 102. In one embodiment, the element 104 provides a circumferential magnetic field that has no magnetic polarity in an axial direction if there is no torque applied to the shaft. If torque is applied to the shaft 102, the resulting stress on the magnetic element causes the direction of the magnetic field to change, providing an axial component of the magnetic field corresponding to the amount of torque applied to the shaft 102.

A magnetometer 106 disposed near the element 104 senses the magnetic field change in the element 104 and determines the amount of applied torque from the change. For clarity, FIG. 1 shows a portion of the magnetometer 106 removed to expose the element 104, but in practice the magnetometer 106 encircles the entire element 104. In one embodiment, the magnetometer 106 detects the torque applied to the shaft 102 by measuring the axial component of the magnetic field, wherein the magnitude of the axial component represents the amount of torque applied to the shaft 102. The magnetometer 106 preferably encircles the shaft 102 without touching the element 104, leaving an air gap between the element 104 and the magnetometer 106. The magnetometer 106 may be any magnetometer 106 that can generate an output corresponding to the detected magnetic field.

Figure 2:
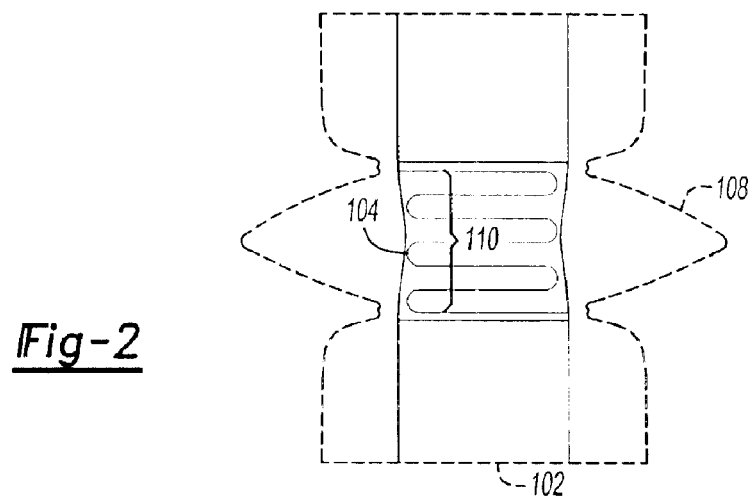
FIG. 2 illustrates one example of a shaft with an attached magnetoelastic element and a representative magnetic field according to one embodiment of the invention.
Figure 3:
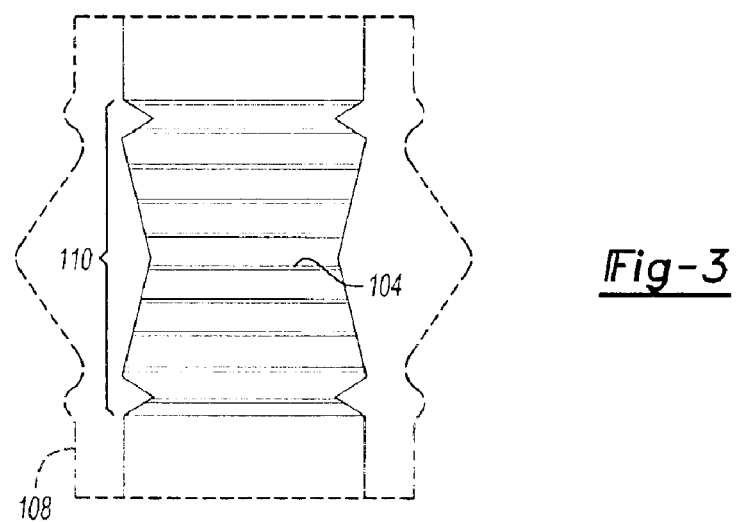
FIG. 3 illustrates one example of a shaft with a attached magnetoelastic element and a representative magnetic field according to another embodiment of the invention.

FIGS. 2 and 3 illustrate two possible examples of the element 104 and their corresponding magnetic fields 108 according to the invention. As shown in the figures, the element 104 in the inventive torque sensor is contoured 110 rather than cylindrical with straight sides. The contouring 110 causes the magnetic field 108 generated by the element 104 to have a curved rather than spiked shape. Because the magnetic field 108 changes gradually rather than exhibiting a sharp spike, the magnetometer 106 will detect only slight changes in the magnetic field 108 if its position deviates axially from the correct measurement location. The slight changes are easily distinguishable from the larger field changes caused by applied torque. If desired, the magnetometer 106 may be designed to filter out the slight changes caused by misalignment and only output values above a selected threshold known to reflect changes caused by applied torque.

The element 104 itself may be formed as a coating of magnetic material, such as nickel, nickel alloy, or other magnetic material applied directly to the shaft 102 via powder coating, spray, or other deposition methods. If the element 104 is manufactured by applying material directly to the shaft 102, any number of known techniques may be used to align the magnetic field from the element 104 so that it can be sensed correctly by the magnetometer 106. The magnetic field 108 may be oriented by creating a circumferentially directed magnetic flux through, for example, crystallizing the magnetic material in an aligning magnetic field, controlling the velocity and temperature of the material being deposited, applying stress on the shaft as the element is being deposited, or managing thermal expansion of the shaft during the deposition process.

The specific method used to contour the element 104 depends on the structure of the element 104 itself and the way the element 104 is attached to the shaft 102. For example, if the element 104 is a magnetic material applied directly to the shaft 102, the shaft 102 itself may be machined to have the desired contour so that the magnetic material forming the element 104 will follow the contours of the shaft 102. The specific shape of the contour 110 is not critical as long as the resulting magnetic field 108 has the desired shape characteristics for reducing the torque sensor's 100 sensitivity to relative positional changes between its components. Possible contour 110 configurations include, for example, an hourglass, a parabola, a hyperbola, two truncated cones, or an ellipse. Once the shaft 102 is contoured, the magnetic coating forming the element 104 will follow the contour of the shaft 102. In other words, shaping the shaft 102 will, in turn, shape the element 104.

Alternatively, the element 104 may be a separate component that is pushed onto the shaft 102 to create a frictional fit. In this case, the contour 110 may be formed either before or after the element 104 is attached to the shaft 102. Regardless of the specific structure of the element 104, the element 104 should be intimately bonded with the shaft 102 so that the deformation in the shaft 102 will be accurately reflected in the deformation, and the resulting magnetic field, of the element 102.

FIG. 3 illustrates an alternative embodiment of the element 104. In this embodiment, the magnetoelastic element 104 has a contour 110 that contains multiple curves, creating a magnetic field 108 having multiple peaks 112. This example illustrates that the element 104 can be shaped to have any profile that generates a desired magnetic field 108 shape. Apply magnetic material to the shaft 102 to form the element 104 makes it easy for the element 104 to conform to even more complex contours 110 on the shaft 102.

Further, contouring the element 104 makes it possible to optimize the magnetic field 108 shape for any given magnetometer 106 by, for example, eliminating any spikes that would introduce position-sensitivity in the torque sensor 100 or improving hysteresis or magnetic field strength characteristics. For example, the element 104 may be contoured to reduce the air gap between the element 104 and the magnetometer 106 if there is an axial displacement between the centerlines of the two elements; the air gap reduction compensates for any reduction in the magnetic field strength caused by the displacement.

Thus, by contouring the magnetoelastic element so that the magnetic field generated by the element has a more rounded profile, the invention desensitizes the torque sensor to changes in the relative position between the magnetometer and the element. As a result, there can be more relative movement between the magnetometer and the element without causing large changes in the magnetometer reading that falsely indicate a change in the applied torque.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A torque sensor that senses torque applied to a shaft, comprising:
    a magnetoelastic element encircling at least a portion of the shaft, wherein the magnetoelastic element has a contour such that an axial dimension of the magnetoelastic element varies, wherein the magnetoelastic element generates a magnetic field corresponding to the applied torque; and
    a magnetometer encircling at least a portion of the magnetoelastic element, wherein the magnetometer senses the magnetic field and generates an output responsive to the magnetic field.

2. The torque sensor of claim 1, wherein the shaft has a contour, and wherein the contour on the shaft forms the contour on the magnetoelastic element.

3. The torque sensor of claim 2, wherein the contour on the shaft and the contour on the magnetoelastic element has a shape selected from the group consisting of an hourglass, a parabola, a hyperbola, two truncated cones, or an ellipse.

4. The torque sensor of claim 2, wherein the magnetoelastic element is formed by applying a material on the shaft through at least one process from the group consisting of powder coating and spray coating.

5. The torque sensor of claim 4, wherein the material contains nickel.

6. The torque sensor of claim 1, wherein the magnetoelastic element is formed as a component separate from the magnetometer and attached to the shaft.

7. The torque sensor of claim 1, wherein the contour on the magnetoelastic element has a shape selected from the group consisting of an hourglass, a parabola, a hyperbola, two truncated cones, or an ellipse.

8. The torque sensor of claim 1, wherein the magnetic field generated by the magnetoelastic element has a shape that exhibits a gradual change in an axial direction of the shaft.

9. A torque sensor that senses torque applied to a shaft having a contour with a varying axial dimension comprising:
    a magnetoelastic element formed by applying a material to at least the contour on the shaft to form a contour with a varying axial dimension on the magnetoelastic element, and wherein the magnetoelastic element generates a magnetic field corresponding to the applied torque and exhibiting a gradual change in an axial direction of the shaft; and
    a magnetometer encircling at least a portion of the magnetoelastic element, wherein the magnetometer senses the magnetic field and generates an output responsive to the magnetic field.

10. The torque sensor of claim 9, wherein the contour on the shaft and the contour on the magnetoelastic element has a shape selected from the group consisting of an hourglass, a parabola, a hyperbola, two truncated cones, or an ellipse.

11. The torque sensor of claim 9, wherein the magnetoelastic element is formed by applying the material on the shaft through at least one process from the group consisting of powder coating and spray coating.

12. The torque sensor of claim 9, wherein the material contains nickel.

13. A method for manufacturing a torque sensor having a magnetoelastic element and a magnetometer and that senses torque applied to a shaft, comprising:
    forming a contour in the magnetoelastic element such that an axial dimension of the magnetoelastic element varies; and
    coupling the magnetoelastic element with the magnetometer such that the magnetometer senses the magnetic field and generates an output responsive to the magnetic field.

14. The method of claim 13, wherein the forming act comprises:
   forming a contour with an varying axial dimension on the shaft; and
   applying a magnetic material on the shaft.

15. The method of claim 14, wherein the applying act is a process selected from the group consisting of powder coating and spray coating.

* * * * *